United States Patent
Fang et al.

(10) Patent No.: US 12,387,470 B2
(45) Date of Patent: Aug. 12, 2025

(54) THREE-DIMENSIONAL POINT CLOUD DATA PROCESSING METHOD AND DEVICE BASED ON INCREMENTAL SPARSE THREE-DIMENSIONAL CONVOLUTION

(71) Applicant: Tsinghua University, Beijing (CN)

(72) Inventors: Lu Fang, Beijing (CN); Leyao Liu, Beijing (CN); Tian Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 395 days.

(21) Appl. No.: 17/815,365

(22) Filed: Jul. 27, 2022

(65) Prior Publication Data

US 2023/0316730 A1    Oct. 5, 2023

(30) Foreign Application Priority Data

Mar. 31, 2022  (CN) .......................... 202210330358.5

(51) Int. Cl.
| | |
|---|---|
| *G06V 10/774* | (2022.01) |
| *G06V 10/26* | (2022.01) |
| *G06V 10/56* | (2022.01) |
| *G06V 10/764* | (2022.01) |
| *G06V 10/82* | (2022.01) |

(52) U.S. Cl.
CPC .......... *G06V 10/7747* (2022.01); *G06V 10/56* (2022.01); *G06V 10/82* (2022.01); *G06V 10/26* (2022.01); *G06V 10/764* (2022.01); *G06V 2201/07* (2022.01)

(58) Field of Classification Search
CPC ........ G06V 10/56; G06V 10/82; G06V 10/26; G06V 10/764; G06V 2201/07
See application file for complete search history.

(56) References Cited

U.S. PATENT DOCUMENTS 11,668,798 B2 *  6/2023  Kumar ................... G06T 11/20
                                                                    701/408

OTHER PUBLICATIONS

Sun, Jiaming & Xie, Yiming & Chen, Linghao & Zhou, Xiaowei & Bao, Hujun. (2021). NeuralRecon: Real-Time Coherent 3D Reconstruction from Monocular Video. 10.48550/arxXiv.2104.00681. (Year: 2021).*

(Continued)

*Primary Examiner* — Matthew C Bella
*Assistant Examiner* — Jinsu Hwang
(74) *Attorney, Agent, or Firm* — Hodgson Russ LLP

(57) ABSTRACT

A method for processing three-dimensional (3D) point cloud data based on incremental sparse 3D convolution is provided. A computer device obtains 3D point cloud data and forms a training set by processing the 3D point cloud data. The computer device constructs and trains a sparse 3D convolutional network model by inputting the training set. The computer device constructs an incremental sparse 3D convolutional network model by performing incremental replacement of sparse convolutional layers of the trained sparse 3D convolutional network model. The computer device inputs real-time 3D point cloud data into the incremental sparse 3D convolutional network model, and determines an output result as a result of processing the real-time 3D point cloud data. Processing of the 3D point cloud data at least includes 3D semantic segmentation, target detection, 3D classification and video processing.

17 Claims, 3 Drawing Sheets

(56) References Cited

OTHER PUBLICATIONS

Graham et al., "3D Semantic Segmentation with Submanifold Sparse Convolutional Networks," Cornell University Library, Nov. 28, 2017.
Sun et al., "NeuralRecon: Real-Time Coherent 3D Reconstruction from Monocular Video," 2021 IEEE/CVF Conference on Computer Vision and Pattern Recognition (CVPR), 2021, pp. 15593-15602.
EPO, Extended European Search Report for EP Application No. 23165770.1, Aug. 25, 2023.

* cited by examiner

```
┌─────────────────────────────────────────────────────────────────────────┐
│ obtain 3D point cloud data, and form a training set of 3D point cloud   │
│ data by processing the 3D point cloud data                              │
│                              10                                         │
└─────────────────────────────────────────────────────────────────────────┘
                                    │
                                    ▼
┌─────────────────────────────────────────────────────────────────────────┐
│ construct a sparse 3D convolutional network model and train the         │
│ constructed sparse 3D convolutional network model by inputting the      │
│ training set into the constructed sparse 3D convolutional network model │
│                              20                                         │
└─────────────────────────────────────────────────────────────────────────┘
                                    │
                                    ▼
┌─────────────────────────────────────────────────────────────────────────┐
│ construct an incremental sparse 3D convolutional network model by       │
│ performing incremental replacement of sparse convolutional layers of    │
│ the trained sparse 3D convolutional network model                       │
│                              30                                         │
└─────────────────────────────────────────────────────────────────────────┘
                                    │
                                    ▼
┌─────────────────────────────────────────────────────────────────────────┐
│ input real-time 3D point cloud data into the incremental sparse 3D      │
│ convolutional network model, and determine an output result as a        │
│ result of processing the real-time 3D point cloud data                  │
│                              40                                         │
└─────────────────────────────────────────────────────────────────────────┘
```

FIG. 1

THREE-DIMENSIONAL POINT CLOUD DATA PROCESSING METHOD AND DEVICE BASED ON INCREMENTAL SPARSE THREE-DIMENSIONAL CONVOLUTION

CROSS REFERENCE TO RELATED APPLICATIONS

This application claims priority to Chinese Application No. 202210330358.5, filed on Mar. 31, 2022, the entire disclosure of which is incorporated herein by reference.

TECHNICAL FIELD

The disclosure relates to a field of deep learning technologies, and in particular, to a three-dimensional (3D) point cloud data processing method based on incremental sparse 3D convolution, a computer device and a non-transitory computer-readable storage medium.

BACKGROUND

Incremental sparse three-dimensional (3D) convolution computations have applications in timing problems in computer vision. Some timing problems, such as visual tasks on video, usually use a single-frame computation method, i.e., input each frame into a convolutional neural network to obtain individual results. Using the incremental computation technology can reduce redundant computations, because there is a lot of duplicate information between video frames, resulting in fast processing speed.

SUMMARY

According to a first aspect, a method for processing three-dimensional (3D) point cloud data based on incremental sparse 3D convolution is provided. The method includes obtaining 3D point cloud data, and forming a training set of 3D point cloud data by processing the 3D point cloud data; constructing a sparse 3D convolutional network model and training the constructed sparse 3D convolutional network model by inputting the training set into the constructed sparse 3D convolutional network model; constructing an incremental sparse 3D convolutional network model by performing incremental replacement of sparse convolutional layers of the trained sparse 3D convolutional network model; and inputting real-time 3D point cloud data into the incremental sparse 3D convolutional network model, and determining an output result as a result of processing the real-time 3D point cloud data, in which processing of the 3D point cloud data at least includes 3D semantic segmentation, target detection, 3D classification and video processing.

According to a second aspect, a computer device is provided. The computer device includes a memory, a processor, and a computer program stored in the memory and executable by the processor. When the processor executes the computer program, the processor is configured to perform the method as described above.

According to a third aspect, a non-transitory computer-readable storage medium is provided. The non-transitory computer-readable storage medium has a computer program stored thereon. When the computer program is executed by a processor, the method as described above is performed.

BRIEF DESCRIPTION OF THE DRAWINGS

The above and/or additional aspects and advantages of the disclosure will become apparent and readily understood from the following description of embodiments taken in conjunction with the accompanying drawings.

FIG. 1 is a flowchart illustrating a 3D point cloud data processing method based on incremental sparse 3D convolution according to embodiments of the disclosure.

DETAILED DESCRIPTION

Figure 2:
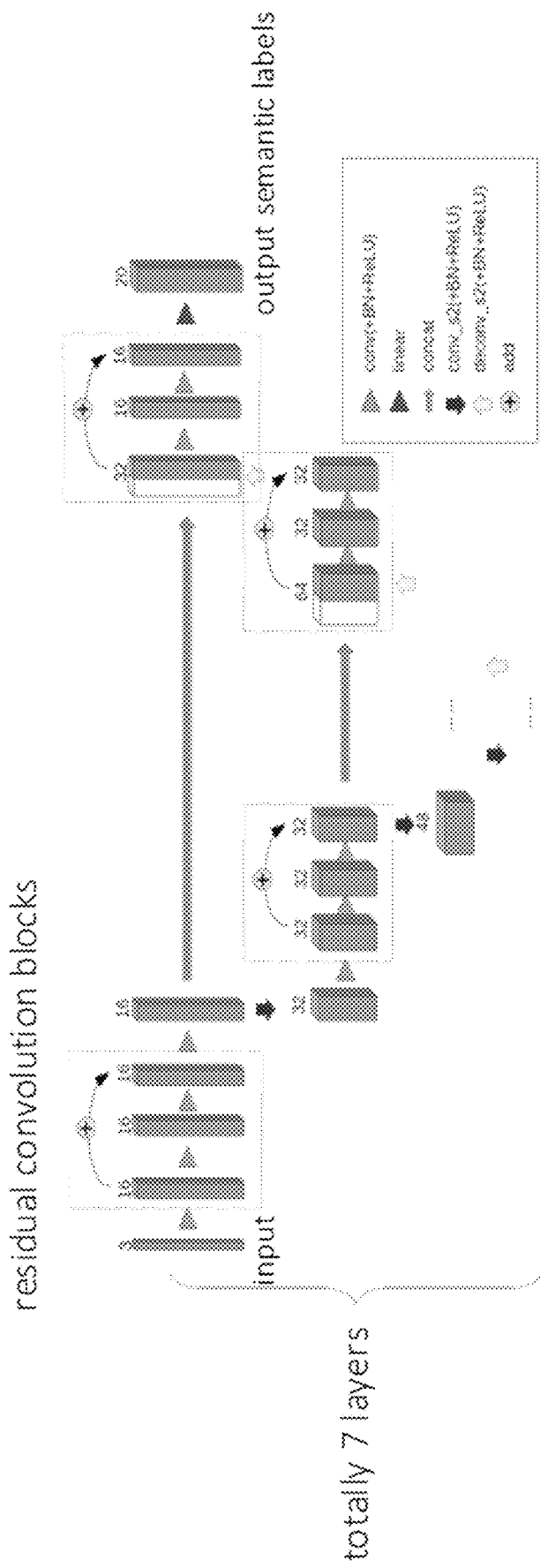
FIG. 2 is a schematic diagram illustrating a structure of an incremental sparse 3D convolutional network model used in a 3D point cloud data processing method based on incremental sparse 3D convolution according to embodiments of the disclosure.

Embodiments of the disclosure are described in detail below, examples of which are illustrated in the accompanying drawings, in which the same or similar reference numerals throughout the disclosure refer to the same or similar elements or elements having the same or similar functions. Embodiments described below with reference to the accompanying drawings are examples, intended to explain the disclosure, and should not be construed as limiting the disclosure.

At present, most of existing incremental convolution computation methods are for dense convolution operations, and thus it is difficult to apply them to the recently emerging submanifold sparse convolution which is widely used in 3D segmentation and detection tasks. With the development of autonomous driving, robotics, etc., temporal 3D tasks have gained extensive attention. These tasks rely on 3D reconstruction, and detection and segmentation are performed on the 3D model reconstructed in real time, which imposes strict requirements on speed. The existing incremental convolution computations are all deal with the dense convolutions and are not suitable for sparse convolutions.

Therefore, a three-dimensional (3D) point cloud data processing method based on incremental sparse 3D convolution is provided, which will be described with reference to the accompanying drawings.

With the method according to embodiments of the disclosure, the 3D point cloud data is obtained and the training set is formed by processing the 3D point cloud data. The sparse 3D convolutional network model is constructed and is trained by inputting the training set into the constructed sparse 3D convolutional network model. The incremental sparse 3D convolutional network model is constructed based on the trained sparse 3D convolutional network model. The real-time 3D point cloud data is input into the incremental sparse 3D convolutional network model, and an output result is determined as a result of processing the real-time 3D point cloud data. Therefore, the online task using the sparse convolution can be accelerated, the incremental computation can be realized, and the network prediction can be accelerated.

FIG. 1 is a flowchart illustrating a 3D point cloud data processing method based on incremental sparse 3D convolution according to embodiments of the disclosure. The method includes the following.

At block 10, 3D point cloud data is obtained and a training set of 3D point cloud data is formed after processing the 3D point cloud data.

At block 20, a sparse 3D convolutional network model is constructed and the constructed sparse 3D convolutional network model is trained by inputting the training set of the 3D point cloud data into the constructed sparse 3D convolutional network model.

At block 30, an incremental sparse 3D convolutional network model is constructed based on the trained sparse 3D convolutional network model. The incremental sparse 3D convolutional network model is configured to perform incremental replacement of sparse convolutional layers of the trained sparse 3D convolutional network model.

At block 40, real-time 3D point cloud data is input into the incremental sparse 3D convolutional network model, and an output result is determined as a result of processing the real-time 3D point cloud data. The processing of the 3D point cloud data at least includes 3D semantic segmentation, target detection, 3D classification and video problems.

Performing, by the incremental sparse 3D convolutional network model, the incremental replacement of the sparse convolutional layers of the trained sparse 3D convolutional network model includes replacing the submanifold layer, the convolution layer and the non-linear layer of the trained sparse 3D convolutional network model with an incremental submanifold layer, an incremental convolution layer and an incremental non-linear layer respectively.

FIG. 2 is schematic diagram illustrating a structure of the incremental sparse 3D convolutional network model.

Incremental computation of the convolutional neural network is a problem to be solved in the computer vision. For many timing problems, such as video problems, the commonly used method is to perform convolutional network computation on each frame, which leads to a lot of redundant computations. Some of the incremental computation methods can find unchanged blocks in the video and use previously computed feature maps for these blocks. Some of the incremental computation methods can find changed points and re-compute their features. All of these methods reuse the previously computed feature maps, thereby saving a lot of time.

It has been proved that the convolutional neural networks are effective for the 2D image signal processing. However, for 3D point cloud signals, the additional dimension z significantly increases the computational effort. In addition, unlike ordinary images, voxels of most 3D point clouds are empty, which makes point cloud data in 3D voxels usually sparse signals. Using a two-dimensional (2D) dense method to perform the convolution computation will lead to low computational efficiency. Therefore, a sparse convolution computation method has been proposed, which only considers non-empty sites (also called active residual sites) in the network. However, as the network propagates, the non-empty sites will dilate, resulting in limited performance. Therefore, a submanifold sparse convolution has been proposed to use a submanifold sparse convolution (SSC) layer, which regulates that the output non-empty sites are identical to the input non-empty sites, thereby limiting the dilation of the non-empty sites.

In the disclosure, an incremental submanifold layer (also called incremental submanifold sparse convolution (INS-SSC) layer) is provided, which constrains that active residual sites of an output layer are the same as the active residual sites of an input layer while the residuals at other sites are set to be 0, to limit the dilation of the residuals and make the computation complexity to be unchanged. Incremental convolution layers allow the dilation of the residuals. An incremental non-linear layer is provided to use the definition of residual for propagation: $dy=g(x+dx)-y$, $g(\ )$ is a non-linear function, and x and y are cached at the previous time step.

By using the incremental sparse convolution layers, i.e., replacing layers of the submanifold sparse convolution with corresponding incremental layers, the incremental computation is realized and network prediction is accelerated.

In detail, a linear map is a function $f(\ )$ that satisfies $f(x+y)=f(x)+f(y)$, and the combination of linear maps is also a linear map: $f(g(x+y))=f(g(x))+f(g(y))$. In neural networks, many modules are linear maps, e.g., convolution layer and linear layer. Some advanced modules like batch normalization and residual blocks also satisfy the above equations by ignoring the potential bias term for simplicity. Thus, based on the combination of linear maps, neural networks composed of these linear modules are linear maps as well. In the incremental computation of the linear function $f$ of the neural network, $f(x+dx)=f(x)+f(dx)$, where x is a previous input, dx is a residual (or a difference) of x at the current time, and $f(x)$ has been computed previously which can be stored and then used directly. In order to compute $f(x+dx)$, merely the $f(dx)$ is computed. The computation of $f(dx)$ indicates that the network is propagating residuals of features, because $f(dx)=f(x+dx)-f(x)=dy$ where y is the output feature of this layer.

The existing submanifold sparse convolution layer causes the dilation of residuals in computing the residuals, thereby resulting in degraded performance, as illustrated in FIG. 1.

In the disclosure, an incremental submanifold sparse convolution layer is provided, which constrains the output active residual sites to be identical to the input, while the residuals at other sites are set to be 0, to limit the dilation of the residuals and make the computation complexity to be unchanged. This constraint could yield incorrect results since the new active site was previously inactive, i.e., the previous feature is set to zero under the constraint of sparse convolution that ignores inactive sites, but it should exist when the site becomes active at the current time. Experimental analysis shows that the error is small and has little effect on the accuracy. The incremental convolution layer allow for the dilation of the residuals.

For example, an incremental submanifold sparse convolution layer performs submainfold sparse convolution on residuals. The sparse convolution is computed for input sites that have non-empty features. This site set is defined as A. In addition an active residual site set B is maintained, which includes input sites that have non-empty residuals. Let the input and output features of current layer at frame t be $x^t$ and $y^t$ respectively. The residuals of input at frame t become $\Delta_x^t = x^t - x^{t-1}$, and the goal is to compute $\Delta_y^t$. The propagation rule for INS-SSC layer is defined as:

$$\Delta_{y_u}^t = \begin{cases} \sum_i W_i \Delta_{x_{u+i}}^t & \text{if } u \in B^t \cap A^{t-1}, \\ \sum_i W_i (\Delta_{x_{u+i}}^t + x_{u+i}^{t-1}) & \text{if } u \in B^t \setminus A^{t-1} \end{cases}.$$

Figure 3:
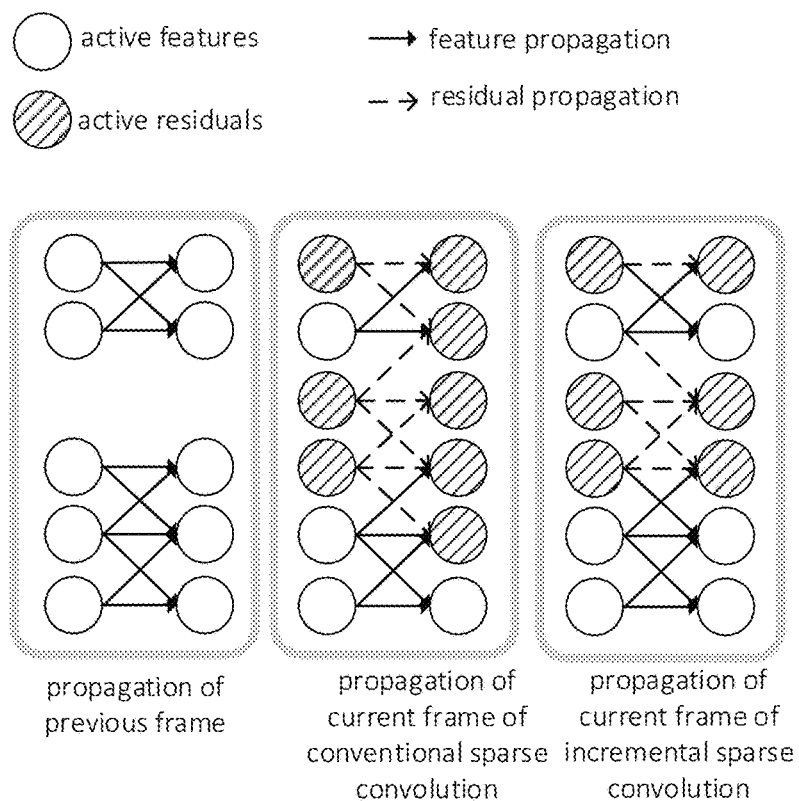
FIG. 3 is a schematic diagram illustrating the incremental sparse submanifold convolution layer according to embodiments of the disclosure.

FIG. 3 gives an intuitive illustration of INS-SSC using 1-D sparse convolution example with a kernel size of 3. Compared with the conventional SSC, the INS-SSC is different in the following. 1) The INS-SSC takes residual as input. 2) The INS-SSC operates on the active residual site set B, rather than the set of all active features A. Since B is much more sparse than A, the INS-SSC can be more efficient. 3)

The INS-SSC constrains the output active residual set to be identical to the input, while the SSC would "dilate" the active residual set after each layer. 4) The INS-SSC follows different convolution rules. The rules used in the SSC could yield incorrect results in the case where u is a new active site that was previously inactive. The previous feature $y_u^{t-1}$ is set to zero under the rule of sparse convolution that ignores inactive sites, but it should exist when u becomes active at current frame, which is denoted as $\hat{y}_u^{t-1}$. The compensation can be made by adding $\hat{y}_u^{t-1}$ to the propagated residual.

In addition, since the non-linear layers are not linear maps, thus could not directly propagate residuals. In order to allow the network to propagate residuals, an incremental sparse non-linear layer is defined, which uses the definition of residual for propagation: $dy=g(x+dx)-y$, where $g( )$ is a non-linear function, and x and y are cached at the previous time step.

The disclosure further realizes online 3D semantic segmentation system, target detection, 3D classification, and video problem by using the incremental sparse convolution. This system relies on SLAM to perform real-time 3D segmentation while performing the reconstruction. The UNet-like submanifold sparse convolutional network is used as the network backbone for semantic segmentation. The layers are replaced with corresponding INS-Conv layers, to achieve incremental inference. Inputs of the network are RGB embeddings of voxels and outputs are semantic probability for semantic segmentation. As an example, at the current time, the residuals between the RGB values of voxels of the currently reconstructed scene and the RGB values at the previous time are obtained. The residuals are input to the incremental sparse convolution to obtain a current output result $f(dx)$. The current output result $f(dx)$ is added to a previous output result $f(x)$ that is cached at the previous time to obtain the output $f(x+dx)$ of the current network. Since residuals is much sparse than the residuals of the currently reconstructed scene, the computational complexity of the network is greatly reduced.

Figure 4:
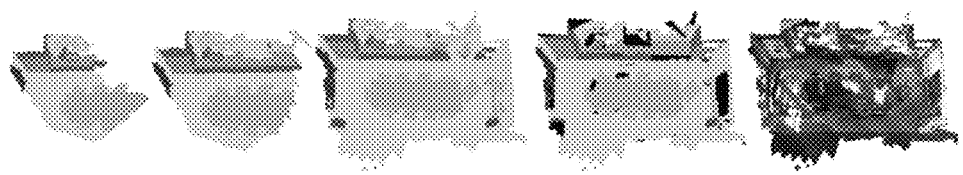
FIG. 4 is a schematic diagram illustrating an instance and semantic segmentation effect of a 3D point cloud data processing method based on incremental sparse 3D convolution according to embodiments of the disclosure.

An online 3D semantic and instance segmentation is tested using the ScanNet dataset. A speed test in one standard large scenarios shows that the system can update the segmentation labels in real time at a segmentation rate of 10 to 15 Hz. The results of segmentation and reconstruction are illustrated in FIG. 4. The left side of each row is the reconstructed geometric model, and the right side is the corresponding generated semantic model.

In order to realize the above-mentioned embodiments, the disclosure further provides a computer device, including: a memory, a processor, and a computer program stored in the memory and running on the processor. When the processor executes the computer program, the 3D point cloud data processing method is performed.

Figure 5:
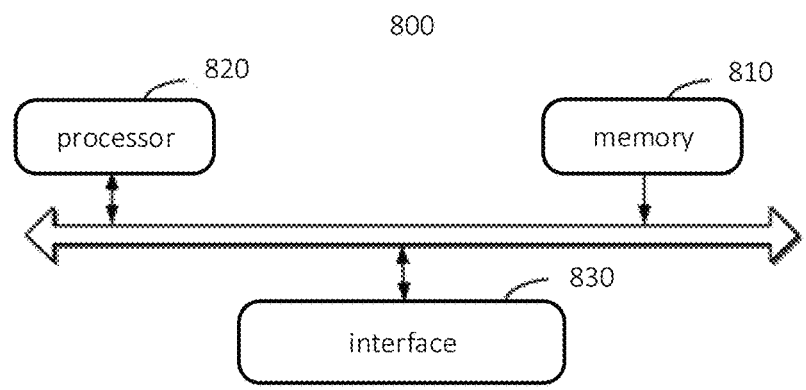
FIG. 5 is a schematic diagram illustrating a computer device according to embodiments of the disclosure.

As illustrated in FIG. 5, the computer device includes a storage medium, such as a memory 810, storing instructions and an interface 830. When the instructions are executed by the processor 820, the 3D point cloud data processing method is performed. Alternatively, the storage medium is a non-transitory computer-readable storage medium. The non-transitory computer-readable storage medium may be ROM, random access memory (RAM), CD-ROM, magnetic tape, floppy disk, and optical data storage device, etc.

In order to implement the above embodiments, the disclosure also provides a non-transitory computer-readable storage medium, having computer programs stored thereon. When the computer programs are executed by a processor, the 3D point cloud data processing method according to embodiments of the disclosure is performed.

In the description of this specification, description with reference to the terms "one embodiment," "some embodiments," "example," "specific example," or "some examples", etc., mean specific features described in connection with the embodiment or example, structure, material or feature is included in at least one embodiment or example of the disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the description of the disclosure, "plurality" means at least two, such as two, three, etc., unless otherwise expressly and specifically defined.

Any process or method description in the flowcharts or otherwise described herein may be understood to represent a module, segment or portion of code including one or more executable instructions for implementing custom logical functions or steps of the process. The scope of the preferred embodiments of the disclosure includes alternative implementations in which the functions may be performed out of the order shown or discussed, including performing the functions substantially concurrently or in the reverse order depending upon the functions involved, which should be understood by those skilled in the art to which the embodiments of the disclosure belong.

The logic and/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from an instruction execution system, apparatus, or apparatus) or equipment. For the purposes of this specification, a "computer-readable medium" can be any device that can contain, store, communicate, propagate, or transport the program for use by or in connection with an instruction execution system, apparatus, or device. More specific examples (non-exhaustive list) of computer readable media include the following: electrical connections with one or more wiring (electronic devices), portable computer disk cartridges (magnetic devices), random access memory (RAM), Read Only Memory (ROM), Erasable Editable Read Only Memory (EPROM or Flash Memory), Fiber Optic Devices, and Portable Compact Disc Read Only Memory (CDROM). In addition, the computer readable medium may even be paper or other suitable medium on which the program may be printed, as the paper or other medium may be optically scanned, for example, followed by editing, interpretation, or other suitable medium as necessary process to obtain the program electronically and then store it in computer memory.

It should be understood that various parts of the disclosure may be implemented in hardware, software, firmware or a combination thereof. In the above-described embodiments, various steps or methods may be implemented in software or firmware stored in memory and executed by a suitable instruction execution system. For example, if implemented in hardware as in another embodiment, it can be implemented by any one of the following techniques known in the art, or a combination thereof: discrete with logic gates for implementing logic functions on data signals Logic circuits, ASICs with suitable combinational logic gates, Programmable Gate Arrays (PGA), Field Programmable Gate Arrays (FPGA), etc.

Those of ordinary skill in the art can understand that all or part of the steps carried by the methods of the above embodiments can be completed by instructing the relevant hardware through a program, and the program can be stored in a computer-readable storage medium, and the program is stored in a computer-readable storage medium. When executed, one or a combination of the steps of the method embodiment is included.

In addition, each functional unit in each embodiment of the disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, they may also be stored in a computer-readable storage medium.

The above-mentioned storage medium may be a read-only memory, a magnetic disk or an optical disk, and the like. Although the embodiments of the disclosure have been shown and described above, it should be understood that the above-mentioned embodiments are exemplary and should not be construed as limiting the disclosure. Embodiments are subject to variations, modifications, substitutions and variations.

What is claimed is:

1. A method for processing three-dimensional (3D) point cloud data based on incremental sparse 3D convolution, performed by an electronic device, comprising:
   obtaining 3D point cloud data, and forming a training set of 3D point cloud data by processing the 3D point cloud data;
   constructing a sparse 3D convolutional network model and training the constructed sparse 3D convolutional network model by inputting the training set into the constructed sparse 3D convolutional network model;
   constructing an incremental sparse 3D convolutional network model by performing incremental replacement of sparse convolutional layers of the trained sparse 3D convolutional network model; and
   inputting real-time 3D point cloud data in an autonomous driving process into the incremental sparse 3D convolutional network model, and performing 3D semantic segmentation, target detection, 3D classification and video processing on the real-time 3D point cloud data by the incremental sparse 3D convolutional network model to determine an output result,
   wherein performing incremental replacement of sparse convolutional layers of the trained sparse 3D convolutional network model comprises:
      replacing a submanifold layer, a convolution layer and a non-linear layer of the trained sparse 3D convolutional network model with an incremental submanifold layer, an incremental convolution layer and an incremental non-linear layer respectively.

2. The method of claim 1, wherein the incremental submanifold layer is configured to constrain active residual sites of an output layer to be identical to active residual sites of an input layer of the incremental sparse 3D convolutional network model, and residuals at other sites to be zero.

3. The method of claim 1, wherein the incremental convolution layer is configured to allow dilation of residuals in the incremental sparse 3D convolutional network model.

4. The method of claim 1, wherein the incremental non-linear layer is configured to use definition of residuals for propagation, wherein the definition of residuals is $dy=g(x+dx)-y$, where $g(\ )$ is a non-linear function, and x and y are cached at a previous time.

5. The method of claim 1, further comprising:
   obtaining the incremental sparse 3D convolutional network model by replacing sparse convolution layers of a UNet-like submanifold sparse convolutional network with the incremental submanifold convolution layers.

6. The method of claim 1, further comprising:
   training and testing the incremental sparse 3D convolutional network model with a ScanNet dataset.

7. The method of claim 6, further comprising:
   performing 3D semantic segmentation using the UNet-like submanifold sparse convolutional network by:
      obtaining residuals between red-green-blue (RGB) values of voxels of a currently reconstructed scene and RGB values at a previous time;
      obtaining a current output result $f(dx)$ by inputting the residuals to the UNet-like submanifold sparse convolutional network; and
      obtaining an output $f(x+dx)$ of the UNet-like submanifold sparse convolutional network by adding the current output result $f(dx)$ to a previous output result $f(x)$ that is cached at the previous time.

8. An electronic device, comprising a memory, a processor, and a computer program stored in the memory and executable by the processor, wherein when the processor executes the computer program, the processor is configured to:
   obtain three-dimensional (3D) point cloud data, and form a training set of 3D point cloud data by processing the 3D point cloud data;
   construct a sparse 3D convolutional network model and train the constructed sparse 3D convolutional network model by inputting the training set into the constructed sparse 3D convolutional network model;
   construct an incremental sparse 3D convolutional network model by performing incremental replacement of sparse convolutional layers of the trained sparse 3D convolutional network model; and
   input real-time 3D point cloud data in an autonomous driving process into the incremental sparse 3D convolutional network model, and perform 3D semantic segmentation, target detection, 3D classification and video processing on the real-time 3D point cloud data by the incremental sparse 3D convolutional network model to determine an output result,
   wherein the processor is configured to:
      replace a submanifold layer, a convolution layer and a non-linear layer of the trained sparse 3D convolutional network model with an incremental submanifold layer, an incremental convolution layer and an incremental non-linear layer respectively.

9. The electronic device of claim 8, wherein the incremental submanifold layer is configured to constrain active residual sites of an output layer to be identical to active residual sites of an input layer of the incremental sparse 3D convolutional network model, and residuals at other sites to be zero.

10. The electronic device of claim 8, wherein the incremental convolution layer is configured to allow dilation of residuals in the incremental sparse 3D convolutional network model.

11. The electronic device of claim 8, wherein the incremental non-linear layer is configured to use definition of residuals for propagation, wherein the definition of residuals is dy=g(x+dx)−y, where g( ) is a non-linear function, and x and y are cached at a previous time.

12. The electronic device of claim 8, wherein the processor is further configured to:
obtain the incremental sparse 3D convolutional network model by replacing sparse convolution layers of a UNet-like submanifold sparse convolutional network with the incremental submanifold convolution layers.

13. The electronic device of claim 8, wherein the processor is further configured to:
train and test the incremental sparse 3D convolutional network model with a ScanNet dataset.

14. The electronic device of claim 12, wherein the processor is further configured to:
perform 3D semantic segmentation using the UNet-like submanifold sparse convolutional network by:
obtaining residuals between red-green-blue (RGB) values of voxels of a currently reconstructed scene and RGB values at a previous time;
obtaining a current output result $f(dx)$ by inputting the residuals to the UNet-like submanifold sparse convolutional network; and
obtaining an output $f(x+dx)$ of the UNet-like submanifold sparse convolutional network by adding the current output result $f(dx)$ to a previous output result $f(x)$ that is cached at the previous time.

15. A non-transitory computer-readable storage medium, having a computer program stored thereon, wherein when the computer program is executed by a processor, a method for processing three-dimensional (3D) point cloud data based on incremental sparse 3D convolution is performed, the method comprising:
obtaining 3D point cloud data, and forming a training set of 3D point cloud data by processing the 3D point cloud data;
constructing a sparse 3D convolutional network model and training the constructed sparse 3D convolutional network model by inputting the training set into the constructed sparse 3D convolutional network model;
constructing an incremental sparse 3D convolutional network model by performing incremental replacement of sparse convolutional layers of the trained sparse 3D convolutional network model; and
inputting real-time 3D point cloud data in an autonomous driving process into the incremental sparse 3D convolutional network model, and performing 3D semantic segmentation, target detection, 3D classification and video processing on the real-time 3D point cloud data by the incremental sparse 3D convolutional network model to determine an output result,
wherein performing incremental replacement of sparse convolutional layers of the trained sparse 3D convolutional network model comprises:
replacing a submanifold layer, a convolution layer and a non-linear layer of the trained sparse 3D convolutional network model with an incremental submanifold layer, an incremental convolution layer and an incremental non-linear layer respectively.

16. The non-transitory computer-readable storage medium of claim 15, wherein the incremental submanifold layer is configured to constrain active residual sites of an output layer to be identical to active residual sites of an input layer of the incremental sparse 3D convolutional network model, and residuals at other sites to be zero.

17. The non-transitory computer-readable storage medium of claim 15, wherein the incremental convolution layer is configured to allow dilation of residuals in the incremental sparse 3D convolutional network model.

* * * * *